(12) United States Patent
Camus et al.

(10) Patent No.: US 8,385,599 B2
(45) Date of Patent: Feb. 26, 2013

(54) SYSTEM AND METHOD OF DETECTING OBJECTS

(75) Inventors: Theodore Armand Camus, Marlton, NJ (US); Aparna Taneja, New Delhi (IN); Mayank Bansal, Lawrenceville, NJ (US); Ankit Kumar, Uttar Pradesh (IN); John Benjamin Southall, Philadelphia, PA (US)

(73) Assignee: SRI International, Menlo Park, CA (US)

( * ) Notice: Subject to any disclaimer, the term of this patent is extended or adjusted under 35 U.S.C. 154(b) by 609 days.

(21) Appl. No.: 12/578,440

(22) Filed: Oct. 13, 2009

(65) Prior Publication Data

US 2010/0092038 A1    Apr. 15, 2010

Related U.S. Application Data

(60) Provisional application No. 61/104,490, filed on Oct. 10, 2008.

(51) Int. Cl.
*G06K 9/00* (2006.01)

(52) U.S. Cl. .................... 382/104; 382/103; 701/301

(58) Field of Classification Search .................... None
See application file for complete search history.

(56) References Cited

U.S. PATENT DOCUMENTS

| | | | |
|---|---|---|---|
| 6,470,271 B2 * | 10/2002 | Matsunaga | 701/301 |
| 7,068,815 B2 | 6/2006 | Chang et al. | |
| 7,321,669 B2 | 1/2008 | Southall et al. | |
| 7,660,436 B2 | 2/2010 | Chang et al. | |

* cited by examiner

*Primary Examiner* — Claire X Wang
(74) *Attorney, Agent, or Firm* — Moser Taboada (57) ABSTRACT

The present invention is a system and a method of segmenting and detecting objects which can be approximated by planar or nearly planar surfaces in order to detect one or more objects with threats or potential threats. The method includes capturing imagery of the scene proximate a platform, producing a depth map from the imagery and tessellating the depth map into a number of patches. The method also includes classifying the plurality of patches as threat patches and projecting the threat patches into a pre-generated vertical support histogram to facilitate selection of the projected threat patches having a score value within a sufficiency criterion. The method further includes grouping the selected patches having the score value using a plane fit to obtain a region of interest and processing the region of interest to detect said object.

15 Claims, 7 Drawing Sheets

Seed Selection

0m < Depth < 35m

Seed Patch

FIG. 6A

20m < Depth < 35m

FIG. 6B

25m < Depth < 35m

FIG. 6C

25m < Depth < 35m

FIG. 6D

FIG. 7

SYSTEM AND METHOD OF DETECTING OBJECTS

CROSS-REFERENCE TO RELATED APPLICATIONS

This application claims the benefit of U.S. Provisional Patent Application No. 61/104,490, filed Oct. 10, 2008, and titled, "Patch Growing Under Local Single/Dual Planarity Constraint," which is herein incorporated by reference.

This application is related to U.S. Non-provisional patent application Ser. No. 10/766,976 filed Jan. 29, 2004 and U.S. Non-provisional patent application Ser. No. 10/617,231 filed Jul. 10, 2003, both of which are assigned to the common assignee, and both of which are hereby incorporated by reference.

FIELD OF THE INVENTION

The present invention relates generally to detection of objects in a cameras' field of view. More specifically, this invention relates to detecting objects under planar constraints.

BACKGROUND OF THE INVENTION

Significant interest exists in the automotive industry for systems that detect objects and utilize the object-detection information in safety, situational awareness, and/or navigational systems. These systems typically detect the presence of potential objects, determine their speed and trajectory, and in the case of safety systems assess their collision threat. Prior art collision avoidance systems are configured to detect such potential objects, however, are limited to several constraints, such as the size of the object, the distance of the object from the camera and the field of view.

One method of detecting objects of potential threats can be found in US 2004/0252863A1, wherein one or more patches are computed in a regular, contiguous rectilinear grid, referred to as "tessellation." Since each patch is an abstraction of (typically) a few hundred data points, this greatly reduces the number of data points that must be processed. Additionally, the regularity of the patch tessellation grid allows for fast hardware implementations (e.g., by FPGA or ASIC) of the initial, computationally-intensive patch-fitting to the 3D depth points. This approach aggregates patches together using simplified rules, considering patches to be connected if they were within fixed height, width and depth tolerances. This approach was acceptable when considering only large objects positioned proximal to (e.g. within 10 meters) the camera which might cause an imminent collision, wherein an aggregated group of patches directly in front of the cameras would always be considered a single object (in particular, a vehicle). However, this approach is limited in the detection of multiple objects at further distances, since it has no way of effectively representing them.

As disclosed in US 2004/0252863A1, threat object detection can be performed in connection with identifying an imminent collision with a threat vehicle. However, this approach is also limited to vehicles or large objects at a short range (i.e. within 10 meters or less) with a 50° field-of-view (FOV), thus detecting for only those objects with a very high FOV and within a limited range.

Therefore, there is a need in the art for new and improved techniques for detecting one or more objects (e.g. threats or potential threats) that are smaller in size and are located at extensive distances from a camera having a limited FOV.

SUMMARY OF THE INVENTION

According to an embodiment of the present invention, the principles of the present invention are provided for segmenting and detecting objects which are approximated by planar or nearly planar surfaces.

According to an embodiment of the present invention, the system and the method for detecting an object in a scene by capturing imagery of a scene proximate a platform and producing a depth map from the imagery, wherein each pixel in the depth map includes associated 3D position data. The method also comprises tessellating the depth map into a number of patches and classifying the plurality of patches as threat patches. The method further comprising projecting the threat patches into a pre-generated vertical support histogram to facilitate selection of the projected patches having a score value within a threshold and grouping the selected patches having the score value using a plane fit to obtain a region of interest. This region of interest is further processed to detect the target object.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE SPECIFICATION

The invention relates to the detection of general objects in the cameras' field-of-view. General objects most notably can include pedestrians, vehicles, poles, motorcycles and bicycles, but can more generally include any structure of sufficient substance to constitute a threat to a host, typically a moving host vehicle. Once a general object is detected, it can be classified, tracked, and its trajectory determined for a collision yes-no decision, with a positive collision decision causing other defensive measures to become activated. While these defensive measures may be application-specific, the object detection et al functions can be viewed as fully general, applicable to a range of applications and defensive measures.

The invention detects objects composed preferably of planar or nearly planar surfaces, including vehicles (which are roughly cuboid in shape), the sides of tall buildings (which are generally approximated by a large & tall single plane), and pedestrians (which are approximated by a single relatively thin plane).

This invention is a general method of segmenting and detecting objects which can be approximated by planar (or nearly planar) surfaces, such as boxes or cuboids. These surfaces are constructed from smaller rectangular regions of roughly co-planar depth points, called "patches". The proposed invention describes a system and method for growing an object's detected 3D extent by incrementally adding patches to an existing object's planar surface description, starting with a seed of a small number, preferably two or three, connected patches, provided that the added patch maintains the surface's planarity criteria. Thus, the proposed approach allows for a more expressive object description that allows differentiation amongst multiple objects classes. For example, a pedestrian object might be represented by a collection of patches approximately 2 meters tall, and 0.5 to 1 meter wide, a sedan by a collection of patches up to 1.5 meters tall and 5 meters long, and a wall by a collection of coplanar patches several meters tall.

Figure 1:
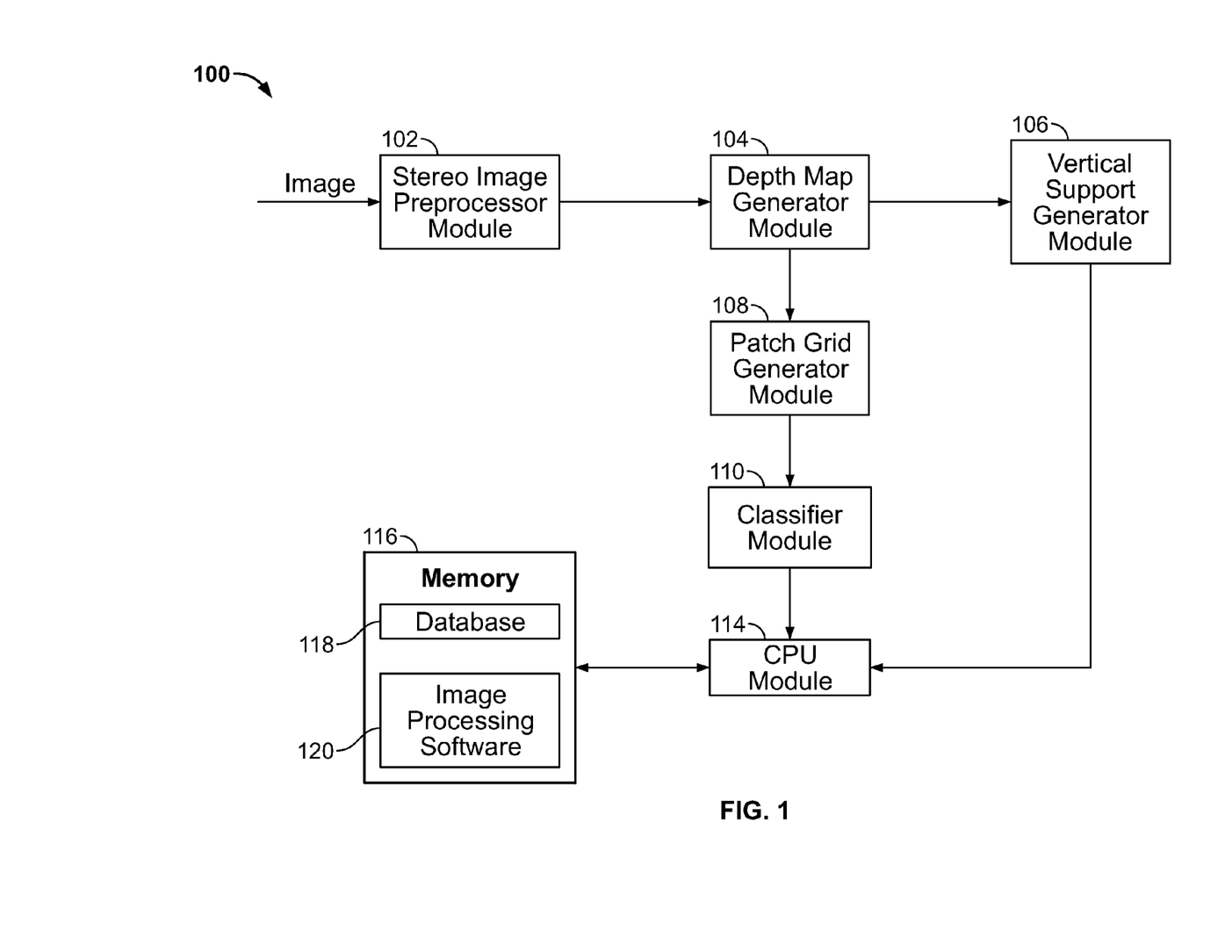
FIG. 1 depicts a schematic view of a block diagram of a system detecting an object having patches growing under planarity constraints in accordance with an embodiment of the present invention.

Referring to FIG. 1, there is shown a block diagram of functional modules of a system 100 for detecting an object having patches growing under planarity constraint including a generation of vertical support. The system comprises a stereo image preprocessor module 102 for capturing, digitizing and processing the stereo imagery from sensor(s) (not shown). These processed stereo images are received by a depth map generator module 104 for producing a depth map of each of the stereo image. As known in the art, a depth map contains data representative of the image points, where each point represents a specific distance from sensor(s). Each of the depth map images is then processed by a vertical support histogram module 106 to generate a vertical support histogram. A vertical support in the present invention is defined as a 2-dimensional "footprint" of detected 3-dimensional points in a scene. The vertical support histogram information can be used preferably to validate or invalidate the likely presence of parts of an object or a whole object, as will be described in greater detail below.

As shown in FIG. 1, the system further comprises a patch grid generator module 108 to process the depth map by tessellating the depth map into a plurality of patches or patch grids. These pluralities of patches are further classified by classifier module 110 as a threat patch or a potential threat patch. It is noted that the details of the stereo image preprocessor module 102, depth map generator module 104, patch grid generator module 106 and the classifier module 108 are provided in commonly assigned U.S. Patent Publication No US20040252863A1.

The system 100 of FIG. 1 further comprises a central processing unit (CPU) module 114 which functions to receive the threat patches and determines whether the threat patches have a good vertical support based on the vertical support histogram. The patches with a good vertical support are further processed by the CPU module 114 for grouping using plane fit to detect a region of interest (ROI). This detected ROI is processed by the CPU module 114 for determining a true positive ROI or an accurate ROI, which is further processed for refinement. As known in the art, CPU module 114 is also coupled to a memory 116 which stores certain software routines that are executed by the CPU 114 to facilitate the operation of the invention. The memory 116 may contain a database 118 of information that are used by the invention and a image processing software 120 that is preferably used by the CPU module 114 to execute its functions.

Figure 2:
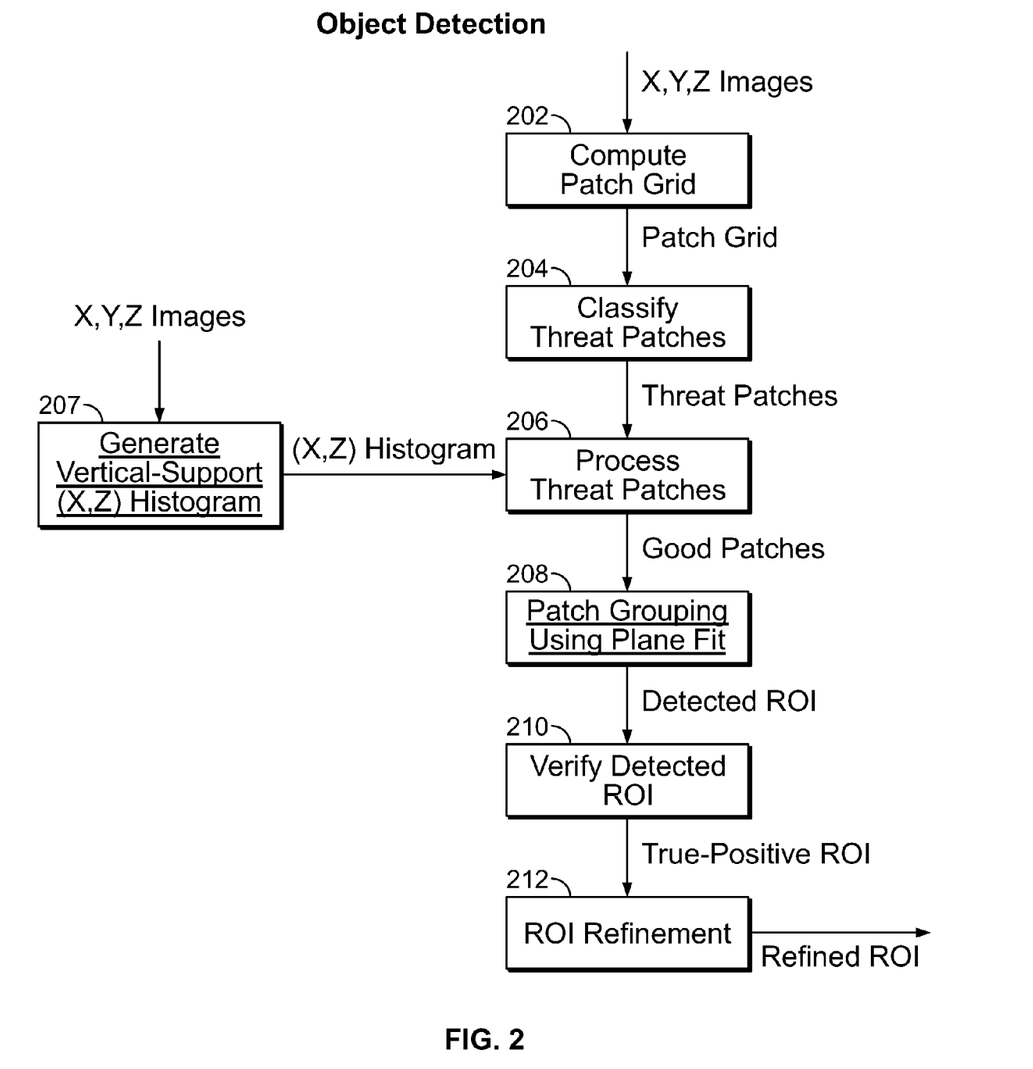
FIG. 2 illustrates a flow chart of a method for detecting an object having patches growing under planarity constraints in accordance with an embodiment of the present invention.

FIG. 2 illustrates a flow chart of the method of detecting an object having patches growing under planarity constraint including the generation of the vertical support. At step 202, a depth image (generated by the depth map generator module 104) comprising of a two-dimensional ray of points with 3-D coordinates X, Y and Z is computed by the patch grid generator 108. This is achieved by a known method of tessellation of patches of the depth image as described in commonly assigned patent publication US20040252863A1. The next step 204 is to classify patches that are a threat or a potential threat using a classifier module 110 also described in commonly assigned patent publication US20040252863A1. A threat in the present invention is characterized as any object that is of large enough size (for example 1-2 square meters), and high enough off the ground and/or that it is vertical or substantially vertical to the ground so as not to be confused with the ground itself. In the next step 206, the threat patches processed and matched against a pre-generated vertical support (X, Z) histogram in step 207. Further in step 206, the threat patches with the poor vertical support are rejected thus generating only those threat patches with good vertical support. This processing and matching of the threat patches in step 206 is performed by the CPU module 114 and the histogram in step 207 is generated by the vertical support generator module 106 of FIG. 1. So, the patches with good vertical support are then grouped using plane fit at step 208 to detect region of interest (ROI). Upon detection of the ROI, the next step 210 verifies that the detected ROI is the true and accurate ROI. There are various forms of false positive (FP) ROI that are not true-positive ROI. Such FP ROIs preferably contain insufficient edge texture, and are thus likely to be unthreatening regions such as the road surface; or contain excessive depth variation, which would be indicative of an incorrect grouping of both close and distant regions. Output of this step 210 is only the true-positive ROI. Then at step 212, this true-positive ROI is further refined using any suitable technique, such as the technique described in commonly assigned U.S. Pat. No. 7,321,669.

There are several methods of computing a vertical support histogram. As described above, a vertical support is a 2-D footprint of detected 3D points in a scene and this 2-D footprint is used to validate or invalidate the likely presence of parts of an object or the whole object itself.

Figure 3:
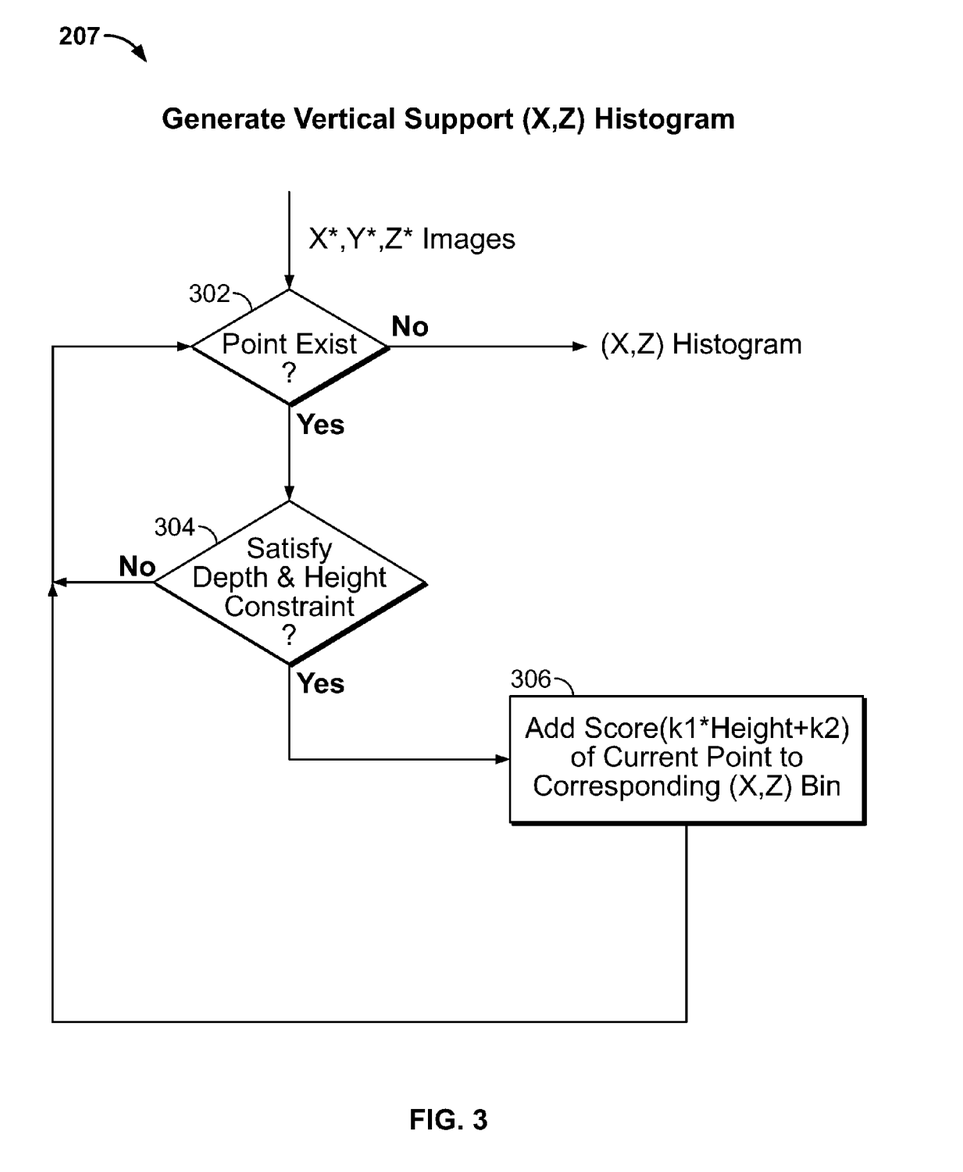
FIG. 3 illustrates a flow chart of computing a vertical support histogram used in object detection in FIG. 2, according to one embodiment of the present invention.

In one preferred embodiment, there is shown a method of generating a vertical support (X, Z) histogram using a height mode as disclosed in a flow chart in FIG. 3. So, the 3D depth image, i.e. X, Y, Z image is initially checked to see if any remaining unprocessed 3D points exist at step 302. If no more unprocessed points exist, the vertical support histogram is complete. If such an unprocessed point does exist, then the 3D point is checked to see if it satisfies the depth and the height constraints at step 304. The depth and height constraints are pre-determined and application specific. For example, if a given 3D point lies outside the height range of interest, e.g. 10 meters high, then the point would be discarded and the next 3D point would be considered. If it does satisfy the depth and the height constraints at step 306, a height value of the current point/pixel in the 3D image is added to the corresponding (X, Z) bin according to the formula 306, with typical values for constants k1=0.5 and k2=0.5. This process is repeated for all the pixels in the 3D image to create a vertical support (X, Z) histogram. Note that in a preferred embodiment, this method of generating vertical support may be combined with a ground-plane estimator, such as disclosed in U.S. Pat. No. 7,068,815, in order to better maintain a constant support level even while the host vehicle may be pitching up or down or driving up an incline or down a decline.

Although not shown, a variance of height at a bin is preferably computed using the above height mode vertical support histogram as described in publication entitled, "Gamma-SLAM: Using Stereo Vision and Variance Grid Maps for SLAM in unstructured environments", by Tim K. Marks et al. In the publication, a technique is disclosed on computing variance of the heights of each point/pixel in the patch grid cells. By computing the variance of the height, the system is not limited to flat surfaces, which is crucial for unstructured outdoor environments.

Figure 4A:
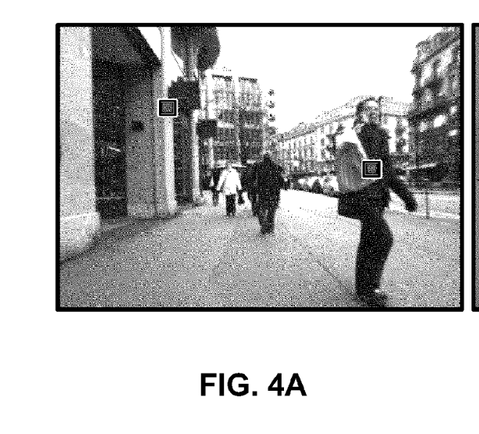
FIG. 4 illustrates computing a vertical support histogram used in object detection in FIG. 2, according to another embodiment of the present invention.
Figure 4B:
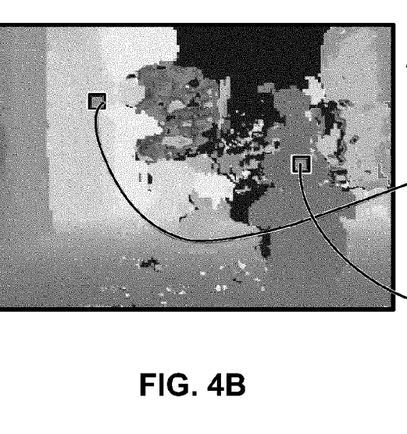
Figure 4C:
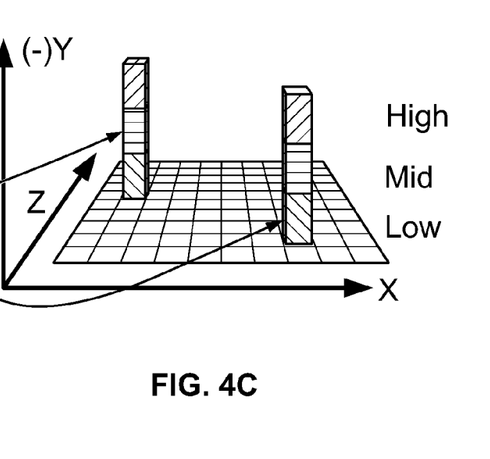

In another preferred embodiment of the present invention with reference to FIG. 4, there is disclosed a technique for generating a vertical support histogram. FIG. 4a discloses a 3D scene with image points and the corresponding depth map in FIG. 4b which are mapped to a histogram of distribution of 3D points in FIG. 4c. So, the ground plane (X, Z) is divided into a rectangular grid at a resolution of $X_{res}*Z_{res}$, X being the lateral value and Z being the depth value of the image points. Then, at each grid cell, a histogram V is created of distribution of 3D points according to their heights. The heights, Y coordinate of all the points in the cell are mapped into a k-bin histogram where each bin represents a vertical height range. In the example of the histogram shown in FIG. 4c the value of k is 3 bins. Additionally, each cell of the histogram is normalized by dividing with the maximum number of pixels that can project into the cell. So, for a cell at a distance Z from the camera (with horizontal and vertical focal-lengths fx and fy respectively, the maximum number of pixels in each image row is, $$N^{max\,row}(Z)=X_{res} \times f_x/Z$$

and the maximum number of image rows in the height-band [Hmin, Hmax] is, $$N^{max\,col}(Z)=(H_{max}-H_{min}) \times f_x/Z$$

where $H_{max}$ is determined taking into account the maximum height that is visible in the image at the distance Z. This gives the normalizing factor for the cell to be, $$N(Z)=N^{max\,row}(Z) \times N^{max\,col}(Z)$$

V(X,Z) is a vertical support histogram defined in 3D space, which is then converted into a 2D image augmented with the 3D height. This vertical support histogram may preferably be used to differentiate various structures. A candidate structural threat, for example, a building, will preferably be expected to have support in the mid-height bin at its (X,Z) cell location. On the other hand, a candidate non-structural threat, for example, a pedestrian or a vehicle, will preferably have object's pixels with low average height, but have support from the lowest bin in its (X,Z) cell. In other words, such candidates will preferably expect to have high vertical support in the lowest bin. Confusion with overhanging structures (for ex: an awning) that are not considered a threat can be detected and avoided by observing the presence of high support in the highest bin of an (X,Z) cell, but also low support in the same cell's middle bin.

Returning back to the flowchart in FIG. 2, upon receipt of the threat patches, at step 206, these patches are processed to match against the pre-generated vertical support histogram in step 207 to accept the threat patches with good vertical support and reject those with poor vertical support. This processing step 206 includes projecting each of the threat patches onto the V (X,Z) histogram using its depth value which is computed preferably by computing mean, median, or mean-around-median of each of the points/pixels of the patch. So, by projecting the patch on the V (X,Z) histogram, a ROI including a plurality of cells is identified in the histogram. A score is computed by the sum of the cells and if that score value is not within a sufficiency criterion or goodness criterion such as a threshold, then the patch is rejected as having a poor vertical support. However, if the score value is within the threshold, then the patch is selected and classified as a patch with good vertical support and is further grouped using plane fit in step 208 as described herein below.

Figure 5:
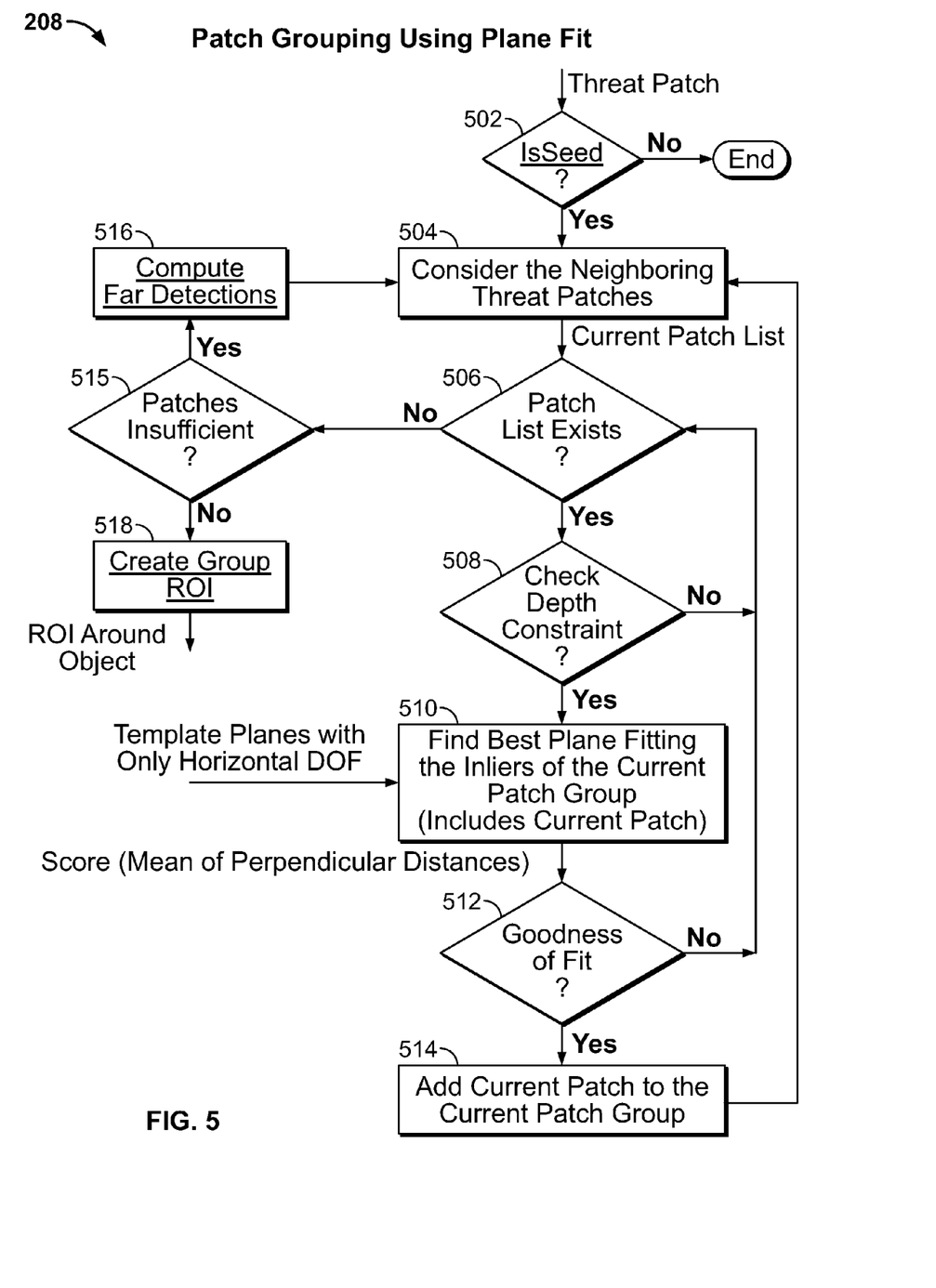
FIG. 5 illustrates a flow chart of a patch grouping using plane fit used in the object detection of FIG. 2, according to an embodiment of the present invention.
Figure 6A:
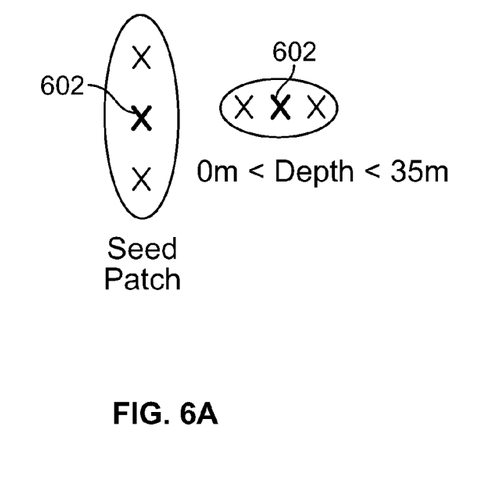
FIG. 6 illustrates seed selection used in patch grouping using plane fit of FIG. 5, according to an embodiment of the present invention.
Figure 6B:
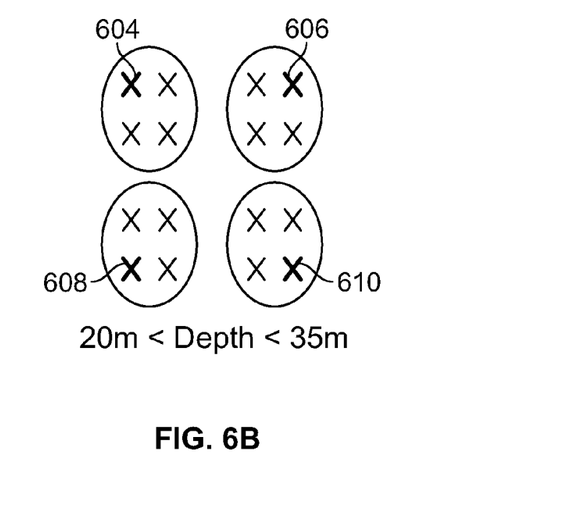
Figure 6C:
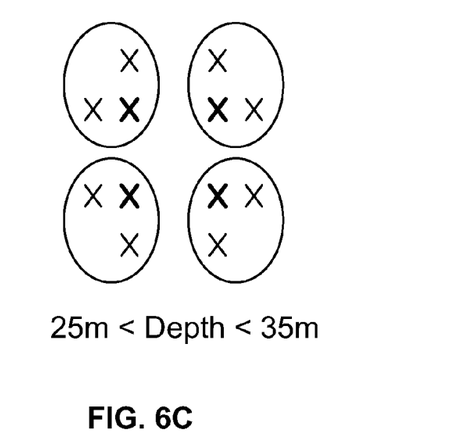
Figure 6D:
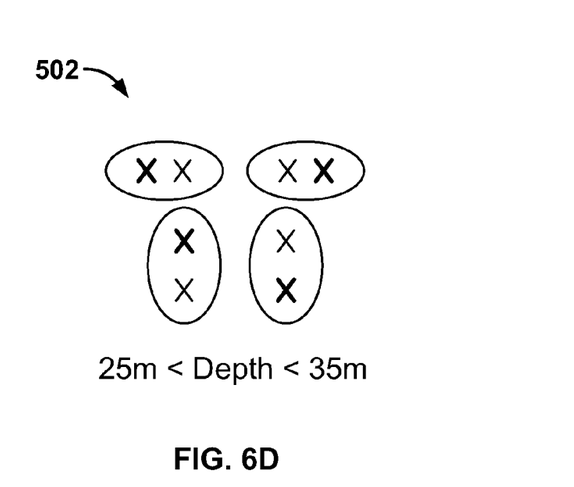

Step 208 of FIG. 2 is patch grouping the good threat patches using plane fit is described in detail in the flow chart of FIG. 5. Initially in step 502, it is determined whether a good threat patch is a seed. For a patch to be considered a seed, it must have a sufficient number of neighbors (adjacent patches) close to it in range, with the number and allowable configurations being a function of the candidate seed patch's depth as shown in FIG. 6. This is a tessellation which is a rectangular grid with adjacent neighbors. The thick bold X 602 is the patch that is selected or considered to be a seed and the neighbors that are queried are the black thin X. The depth bands are used in each of the oval configurations of the seed selections. As long as the patch such as the element 602, which is a candidate for the seed, satisfies any one of those criteria of having valid neighbors within that depth band, then that patch 602 is selected as seed. As shown in FIG. 6, there are preferably four different depth bands that are used as the criteria for seed selection. So, for example, in FIG. 6A, the patch X 602 to be selected as a seed patch, the adjacent neighbors (top, bottom, right and left) must be within the depth band range of 0 m to 35 m. So, in this example, there is only one seed X 602. Another example in FIG. 6B, a patch to be selected as seed patch, all its adjacent neighbors in the oval shapes must be located within the depth band range of 20 m to 35 m. In this example, there are patches, X 604, X 606, X 608 and X 610 in each of the oval shapes are preferably selected as seeds patches.

Returning back to FIG. 5, if the good threat patch is not considered a seed at step 502, then that patch is discarded and the process ends. However, if it is selected as a seed patch in step 502, the four neighboring threat patches of the seed patch are considered in step 504. The seed patch is part of an object and in order to obtain the rest of the parts of the object, the four neighboring patches, for example, left, right, up and down patches would be examined to see if they make a good plane fit with the seed patch. So, for example, if the seed patch is a belly button of a person, then the upward patch, for example, head of the person and the bottom patch, for example, the legs of the person would be examined and since they fit in the plane of the seed patch, i.e. the belly button, these upward and bottom patches would be grouped with the seed patch. Similarly, the left and right patches of the seed patch are also examined for best plane fitting and grouped together as will be described in greater detail below.

In the next step 506, it is checked whether patch list exists or not. In other words, are there one or more patches available for consideration. If there are patch(es) available for consideration, then in the next step 508, it is determined whether these threat patches satisfy the depth constraint. In this step, each candidate threat patches is checked separately to confirm that it is within a certain pre-determined distance from the center of the object. The depth constraint may preferably be dynamic and change based on the current estimate of the object. If the threat patches do not satisfy the depth constraint, then the loop returns back to step 506 to check for other patches. So, for the threat patches that satisfy the depth constraint, the next step is to find best plane fitting for these threat patches in step 510. For purposes of detecting threat objects on the ground plane, the space of planar fits to be vertical planes are restricted at arbitrary orientations relative to the cameras, that is, orientation angle in the horizontal plane is the degree-of-freedom employed as templates. This reflects the expectation that while objects such as vehicles may be at an arbitrary intersection angle relative to a host vehicle's cameras, the objects are generally in a normal upright configuration. A group of all the currently accepted patches having an optimal planar fit already exists and each of the candidate threat patches that satisfy the depth constraint is attempted to fit with the plane of current group of patches using the template planes with only horizontal DOF to find a good planar fit at step 510. Initially, this group of currently accepted patches includes a single seed patch. Then at step 512, it is determined whether each of the four neighboring threat patches considered passes the goodness of fit test, in other words, if it fits in the same plane as the current group of patches, which initially is a seed patch. So, for example, if the current group patch includes a plane for a side of a car, then the four neighboring threat patch is placed to see if it fits in this plane of the side of the car. The goodness of fit measure can be for example the average residual error of the planar fitting process to the selected patches' 3D points. So, if any of the four neighboring threat patches pass the goodness of fit test then they are added to the current group patch in step 514 and then the loop returns to step 504 where now the neighboring patches of the current patch(es) added to the group is considered instead of considering the neighboring patches of the seed patch. This way, the loop continues with the step 504 for each of the current patches keep getting added to the group to eventually obtain a complete identification of the object. However, if the optimal fitted plane does not pass the goodness of fit test at step 512 for any given candidate patch, then that patch is discarded as a candidate for the current object, and the process returns to step 506 to check for any other patches left for consideration.

Once all the seed patches are considered, at step 504, then at step 506, it is determined that the patch list is exhausted, i.e. all the patches for that object in the tessellated gird have been considered and processed. Then, at step 515, the system checks whether all the patches processed in the list are sufficient to create group ROI around the object. If the number of patches for the detected object is insufficient, then far detections is computed in step 516. Note that the patches may be considered insufficient due to the fact that the object may be located at farther distance such as about 40-50 m away from the camera and/or the object is smaller in size and the existing fixed size patch grid is not sufficient to capture or detect this object. The step 516 of far detections includes circumscribing the patches in the tessellated grid and extending the patches according to their depth to obtain maximum ROI bounding all the patches in the grid. Then, a small rectangular grid of preferably 10×10 resolutions is created in the middle of this maximum ROI and a center patch of the grid is selected as a seed patch. In other words, in the far detection computation, it is determined by the insufficient patches in the grid that an object may exists and need to obtain more patches to detect the object and thus a finer smaller resolution of the patch grid is created. Upon selection of this seed patch, the process is repeated beginning with step 504 to 514 to group the patches using the plane fit to grow the object.

However, if at step 514, the patches processed are sufficient, then at step 518, a group ROI is created. This step 518 of group ROI initially determines whether the object detected is a single object or multiple objects and if it is multiple objects, then further functions to split the object into the multiple objects. So, for example, if two objects that are very close to each other are detected as one object, then the group ROI is preferably computed in step 518 to detect these two objects as separate objects and to split them into two separate objects. This step 518 is described in detail with respect to a flow chart in FIG. 7.

Figure 7:
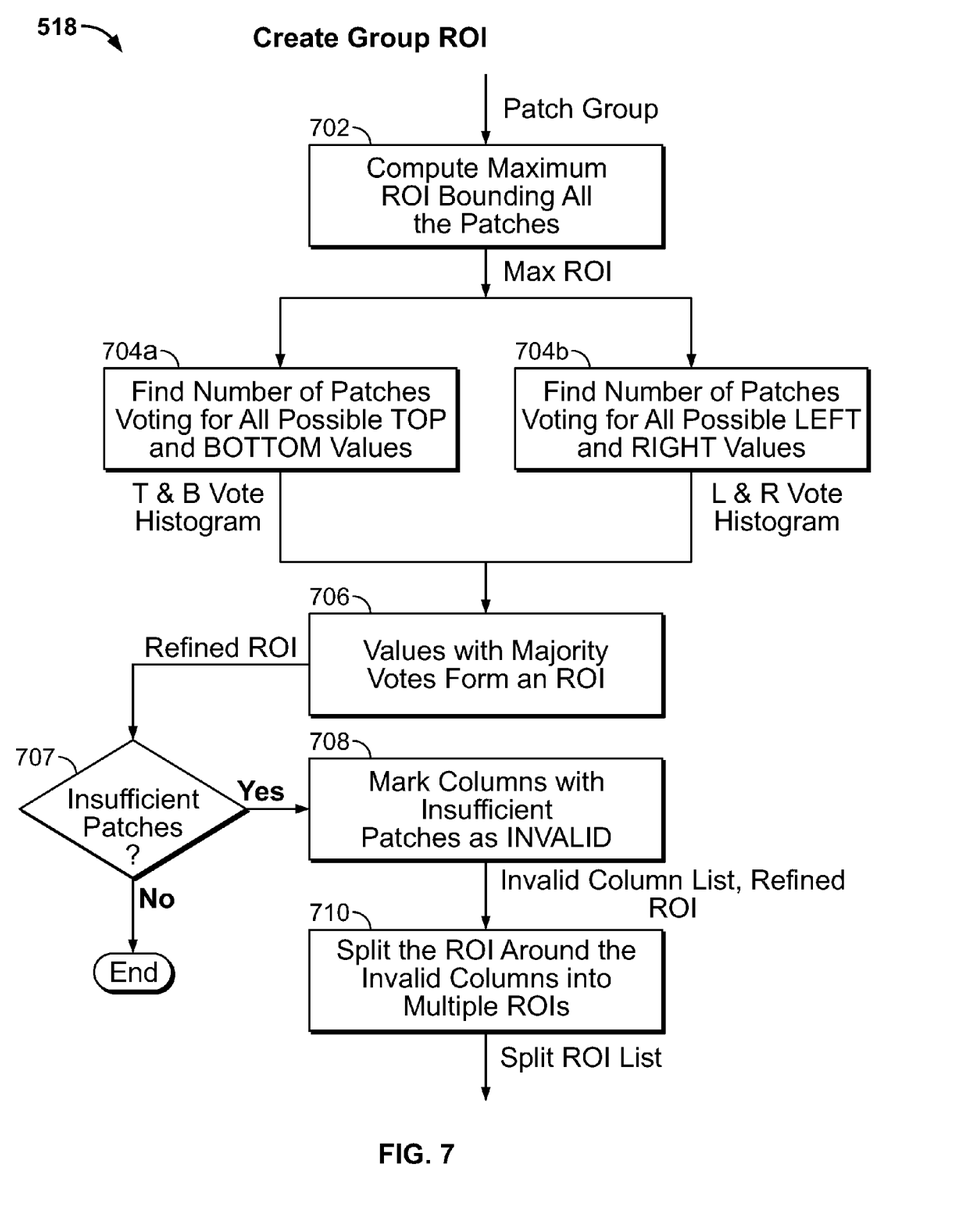
FIG. 7 illustrates exemplary steps for the creation of a region of interest used in patch grouping using plane fit of FIG. 5.

As shown in FIG. 7, the first step to create group ROI is to compute maximum ROI bounding all the patches of an object at step 702. Then at step 704a, a number of patches voting for all possible top and bottom values are found. In other words, all the top and bottom edges of the patches of the object are determined in this step. Similarly, in step 704, a number of patches voting for all possible left and right values of the object are determined. Then at step 706, an ROI is formed from the values with majority votes creating a refined ROI which is followed by step 707 to determine whether there are an insufficient number of patches in any of the columns of the refined ROI. If there are a sufficient number of patches in each column, then the process ends indicating that the objected detected in the refined ROI is a single object. However, if it is determined that there are columns with an insufficient number of patches, then in step 708, the columns of the refined ROI with insufficient patches are marked as invalid, thus creating an invalid column list. So, for example, if two persons are standing very close to each other preferably two feet apart are detected as one object since they fall in the same plane. However, by detecting the edges of the patches of the persons in steps 704a and 704b, there will be a set of edges or column of patches for each of the persons. Then at step 706 the column of patches with maximum values, i.e. majority of patches that compose the object are determined and if there are insufficient patches as determined in step 707, then at step 708, the column of patches with space between the two persons will be marked invalid, i.e. are not part of the object, thus creating a refined ROI. Finally, at step 710, this refined ROI is split around the invalid columns into multiple ROIs, thus creating the group ROI. This completes the step 208 of patch grouping using planar fit of FIG. 2.

While the foregoing is directed to embodiments of the present invention, other and further embodiments of the invention may be devised without departing from the basic scope thereof, and the scope thereof is determined by the claims that follow.

The invention claimed is:

1. A computer implemented method for detecting an object in a scene comprising the steps of:

receiving, using a processor, classified threat patches having a depth map of 3D pixels of an image in the scene using a processor, wherein each said pixel includes associated 3D position data;

projecting, using said processor, said classified threat patches into a pre-generated vertical support histogram to facilitate selection of said projected threat patches having a score value within a sufficiency criterion, said vertical support histogram is a 2-D footprint of 3-D pixels in the image of the threat patches and the vertical support histogram is generated by retrieving and summing up height value of each of the 3-D pixel that satisfies depth and height constraints, according to:

$$N^{max\ row}(Z) = X_{res} \times f_x/Zx$$

$$N^{max\ col}(Z) = X_{res} \times f_x/Zx$$

$$N(Z) = N^{max\ row}(Z) \times N^{max\ col}(Z)$$

where $N^{max\ row}$ is maximum number of pixels in each image row, Z is distance of a rectangular grid cell from a camera, $X_{res}$ is a lateral value, $f_x$ is a horizontal focal length, $N^{max\ col}$ is maximum number of image rows in the height band $[H_{max}, H_{min}]$, $f_y$ is a vertical focal length, $H_{max}$ is the maximum height visible in the image at the distance Z and $H_{min}$ is the minimum height visible in the image at the distance Z;

grouping, using said processor, said selected patches in a plane fit to obtain a region of interest (ROI) in the image, said ROI comprising a plurality of grid cells with 2D pixels; and processing, using said processor, said region of interest in the image to detect said object.

2. The method of claim 1 wherein said projecting comprising computing one of a mean, median or mean-around-median of the threat patches' (X,Z) coordinates to identify a region of interest (ROI) in the histogram, said ROI comprise a plurality of rectangular grid cells with 2D pixels.

3. The method of claim 2 further comprising computing a score value of sum of said cell s and matching the score value with the sufficiency criterion to select said projected threat patches.

4. The method of claim 1 wherein said grouping comprising the steps of:
(a) determining whether the selected threat patch is a candidate for a seed patch;
(b) identifying neighboring patches of the selected threat patch if said selected threat patch is the candidate seed for the patch;
(c) checking whether the candidate threat patch satisfy depth constraint;
(d) fitting the candidate threat patch in a plane of a current patch group if said candidate threat patch satisfies the depth constraints; said candidate threat patch is fitted using template planes with arbitrary orientations in the horizontal plane;
(e) determining whether each of the neighboring patches of the fitted candidate threat patch fit in the same plane of the current patch group; and
(f) adding each of the neighboring patches in the current patch group if the given neighboring patch fit a in the same plane of the current patch group;
(g) repeating steps (b) through (l) for all the selected threat patches that are the candidates for the seed patch.

5. The method of claim 4 further comprising repeating steps (b) through (f) for all the added neighboring patches in the current patch group.

6. The method of claim 4 further comprising determining whether the current patch group includes sufficient patches to create a group region of interest (ROI) around the object.

7. The method of claim 6 wherein if it is determined that the current group patch does not include sufficient patches, performing the steps of:
circumscribing the patches in the current group patch in a tessellated grid;
extending the patches according to their depth to maximize the ROI around the object;
selecting a center patch of the grid as the seed patch; and
repeating steps (b) through (l) of claim 4.

8. The method of claim 6 further comprising creating a group ROI around the object if it is determined that the current group patch includes sufficient patches.

9. The method of claim 8 further comprising wherein said creating comprising the steps of:
computing maximum ROI bounding all the patches in the current group patch;
locating a set of number of top and bottom patches in the maximum ROI;
locating a set of number of left and right patches in the maximum ROI;
comparing the set of top and bottom matches with the set of left and right patches to retrieve the set with higher number of patches to form a refined Rot.

10. The method of claim 9 further comprising determining whether one or more portions of the refined ROI include in sufficient patches to detect said object.

11. The method of claim 10 further comprising identifying the one or more portions of the refined ROI including in sufficient patches.

12. The method of claim 11 further comprising splitting the refined ROI around the one or more portion s into one or more refined ROIs.

13. The method of claim 1 further comprising:
capturing imagery of the scene proximate a platform using a stereo image preprocessor;
producing the 3D depth map from the imagery using a depth map generator;
tessellating the depth map into a plurality of patches using a patch grid generator; and
classifying the plurality of patches as threat patches using the classifier module.

14. A system for detecting an object in a scene comprising:
a stereo image preprocessor module for capturing, digitizing and preprocessing a stereo imagery;
a depth map generator module for producing a 3D depth map from the imagery, wherein each pixel in the depth map includes associated 3D position data;
a vertical support generator module for processing said 3D depth maps to generate a vertical support histogram, said vertical support histogram is a 2-D footprint of a 3-D pixels in the depth map and the vertical support histogram is generated by retrieving and summing up height value of each of the 3-D pixel that satisfies depth and height constraints, according to:

$$N^{max\ row}(Z) = X_{res} \times f_x/Zx$$

$$N^{max\ col}(Z) = X_{res} \times f_x/Zx$$

$$N(Z) = N^{max\ row}(Z) \times N^{max\ col}(Z)$$

where $N^{max\ row}$ is maximum number of pixels in each image row, Z is distance of a rectangular grid cell from a camera, $X_{res}$ is a lateral value, $f_x$ is a horizontal focal length, $N^{max\ col}$ is a maximum number of image rows in the height band $[H_{max}, H_{min}]$, $f_y$ is a vertical focal length, $H_{max}$ is the maximum height visible in the image at the distance Z and $H_{min}$ is the minimum height visible in the image at the distance Z;

a patch grid generator for tessellating the depth map into a plurality of patches;
a classifier module for classifying said plurality of patches as threat patches;
a processor coupled to the classifier module and the vertical support generator module to function to project said classified threat patches into the vertical support histogram to facilitate selection of said projected threat patches having a score value within a sufficiency criterion, said processor further functions to group said selected threat patches having said score value using a plane fit to obtain a region of interest in the image and processes said region of interest in the image to detect said object.

15. A computer implemented method for detecting an object in a scene comprising the steps of:

receiving, using a processor, classified threat patches having a depth map of 3D pixels of an image in the scene using a processor, wherein each said pixel includes associated 3D position data;

projecting, using said processor, said classified threat patches into a pre-generated vertical support histogram to facilitate selection of said projected threat patches having a score value within a sufficiency criterion, said vertical support histogram is a 2-D footprint of 3-D pixels in the image of the threat patches;

grouping, using said processor, said selected patches in a plane fit to obtain a region of interest (ROI) in the image, said ROI comprising a plurality of grid cells with 2D pixels, the grouping comprising the steps of:

(a) determining whether the selected threat patch is a candidate for a seed patch;
(b) identifying neighboring patches of the selected threat patch if said selected threat patch is the candidate seed for the patch;
(c) checking whether the candidate threat patch satisfy depth constraint;
(d) fitting the candidate threat patch in a plane of a current patch group if said candidate threat patch satisfies the depth constraints; said candidate threat patch is fitted using template planes with arbitrary orientations in the horizontal plane;
(e) determining whether each of the neighboring patches of the fitted candidate threat patch fit in the same plane of the current patch group; and
(f) adding each of the neighboring patches in the current patch group if the given neighboring patch fit s in the same plane of the current patch group;
(g) repeating steps (b) through (l) for all the selected threat patches that are the candidates for the seed patch; and processing, using said processor, said region of interest in the image to detect said object.

* * * * *